(12) United States Patent
Caldwell

(10) Patent No.: US 9,216,367 B1
(45) Date of Patent: Dec. 22, 2015

(54) OIL FIELD TEST AND SEPARATION SYSTEM

(71) Applicant: Dennis P. Caldwell, Borger, TX (US)

(72) Inventor: Dennis P. Caldwell, Borger, TX (US)

( * ) Notice: Subject to any disclaimer, the term of this patent is extended or adjusted under 35 U.S.C. 154(b) by 0 days.

(21) Appl. No.: 14/622,379

(22) Filed: Feb. 13, 2015

(51) Int. Cl.
*B01D 19/00* (2006.01)
*B01D 17/02* (2006.01)
*B01D 17/12* (2006.01)

(52) U.S. Cl.
CPC ............ *B01D 19/0063* (2013.01); *B01D 17/02* (2013.01); *B01D 17/12* (2013.01); *B01D 19/0068* (2013.01)

(58) Field of Classification Search
None
See application file for complete search history.

(56) References Cited

U.S. PATENT DOCUMENTS

| | | | | |
|---|---|---|---|---|
| 4,951,700 A | * | 8/1990 | Kalman | 137/174 |
| 6,736,964 B1 | * | 5/2004 | Caldwell | 210/87 |
| 8,298,407 B1 | * | 10/2012 | Caldwell | 210/95 |

* cited by examiner

*Primary Examiner* — Duane Smith
*Assistant Examiner* — Phillip Shao
(74) *Attorney, Agent, or Firm* — Edward L. White

(57) ABSTRACT

An improved fluid separator and tester having a vessel, an adjustably buoyant float member, an external surge tank, and a gas vent connected to the fluid separator having a float and gas valve assembly, the improvement comprising a set of risers set to equal height, at least one valve to redirect fluid flow to test flow meters, and a spill preventer having a connection to a vertical gas valve, a housing, at least one internal freely movable float, upper float seat adapted to receive a float to seal and prevent the escape of particulates while allowing the venting of gas, a float support means, and discharge means for expelling the contents, whereby the improvements provide increased accuracy in determining a volume of each type of input fluid during operations, allow for the assessment of proper operation of the meters, and prevent environmental contamination in the event of system malfunction.

6 Claims, 10 Drawing Sheets

OIL FIELD TEST AND SEPARATION SYSTEM

CROSS-REFERENCE TO RELATED APPLICATIONS

None.

FIELD OF THE INVENTION

The invention generally relates to separation of a fluid mixture into its components of oil, gas, and water and meter the volumes of the oil and water components produced.

SUMMARY OF THE INVENTION

The invention relates to a system for separating and measuring mixed fluids. Specifically the invention may be applied to the separation of crude oil, gas, and water coming from a production well and the volumetric measurement of crude oil and water using a mechanical portable device. More particularly, the invention relates to a system involving a fluid control manifold, a gas vent affixed to the top of a surge tank whereby the gas may be removed from the fluid mixture before entering the fluid separator, a spill preventer inhibiting an oil spill in case of a gas vent failure, a separation apparatus with a separation vessel, an adjustable float within the vessel, which allows the fluid of lower specific gravity to be released from the top of the separation vessel through an upper pipeline, the higher specific gravity fluid to be released from the bottom of the separation vessel through a lower pipeline, wherein both the pipelines rise to the same height to prevent biasing the float, fluid volume meters on each of the pipelines to measure the liquid flowing through the respective pipelines, and a system of valves that allow each meter to be checked for proper operation without removal of either meter. The apparatus presented as a portable unit allowing for an accurate measurement of the fluids being extracted by the pumping devices at different locations.

Oil wells operate to extract petroleum products from the ground in the general form of a mixture of crude oil, natural gas products, and water, including ground water or recovered water previously injected into the ground to urge the oil from the static confines of the earth or strata. For purposes of regulatory compliance, and also to measure the mechanical and economic efficiency of the well outputs, it is desired to measure the output of the component fluids to ascertain the volume of the crude oil and water extracted. Testing of each well site is recommended periodically, sometimes daily.

Problems encountered in the oil fields of the past have been identified as: (1) the accuracy of the measurement of the volume of constituent fluids being extracted from the well and transferred to the tank batteries; (2) the cost of the testing and measuring equipment; (3) the portability of the testing and measuring equipment; (4) fluid spills; and (5) diagnostic testing of the metering equipment in the field Current devices and methods do not satisfactorily address all these prior problems. In U.S. Pat. No. 6,736,964 to Caldwell, he teaches an apparatus that allows the separation and measuring of mixed fluids, specifically separation of crude oil and water. This system reduced the cost of testing and measuring while also making the system easily transferred from one well site to another for use. However one serious drawback involved incorrect metering when and if medium to high volume gas was present with the fluids. A gas cap could accumulate in with the surge tank and the system provided no release for the gas if too much accumulated. This prior device was sufficient for low volume from the gas wells but in higher volume wells, once the gas had sufficient accumulation in the gas cap at the top of the surge tank, the gas could be introduced back into the fluid mixture, thus contaminating the volume measurements. Additionally, the lower pipeline coming from the bottom of the fluid separator was not elevated to the same height as the top pipeline coming from the top of the fluid separator which could bias the internal float thus preventing normal separation operation.

In U.S. Pat. No. 6,736,964 to Caldwell, he teaches a gas vent that allows gas to be expelled instead of accumulated in the gas cap, thereby possibly interfering with the volumetric measurement. This gas vent is attached to the surge tank in U.S. Pat. No. 6,736,964 allowing for the accumulated gas to exit through the gas vent thus removing gas prior to the fluid mixture entering into the fluid separator.

The prior art addressed a portion of the problems including the measurement accuracy associated with the volume of constituent fluids being extracted from the well, the cost of the testing and measuring equipment, the portability of the testing and measuring equipment but did not address concerns with accuracy due to the biasing of the float or with respect to fluid spills.

The present invention overcomes these shortcomings by providing a system with improved accuracy of the volumetric measurements of oil and water by minimizing any float bias, adding a spill preventer to activate upon a malfunction of the horizontal float in the gas vent, and minimizing spills through self-contained diagnostics of the meter thus minimizing their removal and the spillage associated with the removal and replacement of a meter.

The present invention solves the problems identified above by offering an improved oil field testing system. The present invention fulfills the industry's need for an environmentally friendly and accurate oil well measurement system, which prevents needless environmental soil contamination while presenting a more realistic account of the well contents.

There have thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. Additional benefits and advantages of the present invention will become apparent to those skilled in the art to which the present invention relates from the subsequent description of the preferred embodiment and the appended claims, taken in conjunction with the accompanying drawings. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

DESCRIPTION OF THE DRAWINGS

FIG. 3A shows the valves in a position that sends fluids through the system. FIG. 3B shows the valves in a position that bypasses the system.

DETAILED DESCRIPTION OF THE INVENTION

Figure 1:
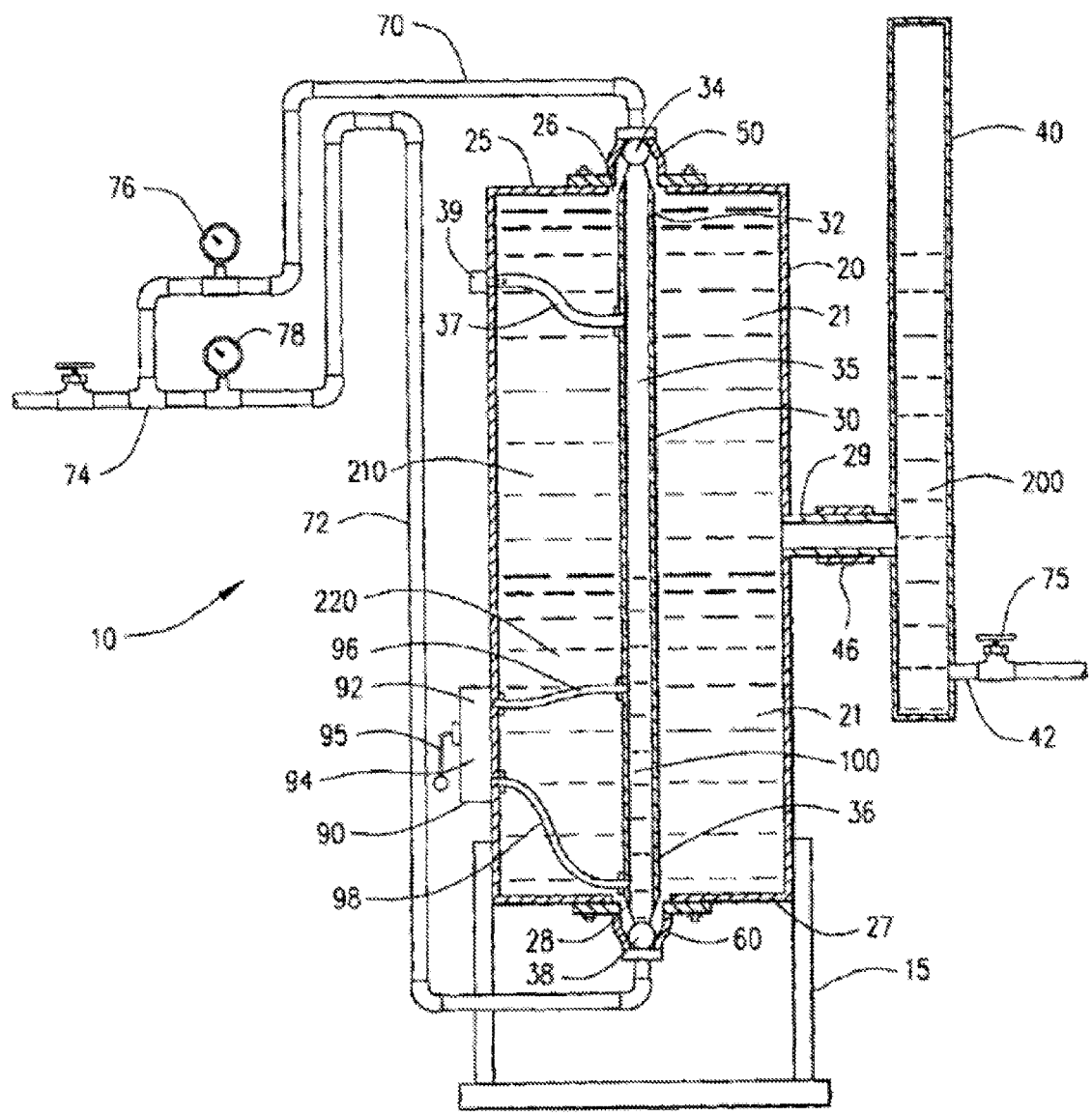
FIG. 1 is a system drawing of a prior art apparatus for separating mixed fluids and measuring quantity of component fluids as illustrated in U.S. Pat. No. 6,736,964 to Caldwell.

FIG. 1 shows the system of prior art U.S. Pat. No. 6,736,964 herein incorporated by reference an apparatus for separating and measuring mixed fluids, directed especially towards the separation of crude oil and water and the volumetric measurement of each of the primary constituent fluids, the apparatus 10 comprising essentially a vertically oriented cylindrical vessel 20 positioned on a support frame 15, the vessel 20 having an interior 21, an exterior surface, an upper outlet 26 located in a top portion 25 of the vessel 20, a lower outlet 28 located in a bottom portion 27 of the vessel 20 and an inlet 29 located approximately half way between the top portion 25 and bottom portion 27 from the exterior surface into the interior 21 of the vessel 20, an adjustably buoyant vertical float member 30 positioned within the interior 21 of the vessel 20, the float member 30 having an upper end 32 and a lower end 36, an upper housing 50 attached to the upper outlet 26, a lower housing 60 attached to the lower outlet 28, each of the upper housing 50 and lower housing 60 having a tapered interior seat adapted to sealably engage rounded ball seals 34, 38 on the respective upper end 32 and lower end 36 of the float member 30, an external surge tank 40 connecting to the inlet 29, the external surge tank 40 further connected to the outlet of an oil well or fluid source, not shown nor claimed as part of the apparatus, a first pipeline 70 connecting to the upper housing 50 having a fluid flow measuring first meter 76 measuring the fluid flowing from the upper outlet 26 of the vessel 20, a second pipeline 72 connecting to the lower housing 60 having a fluid flow measuring second meter 78 measuring the fluid flowing from the lower outlet 28 of the vessel 20, and a third pipeline 74 beyond the first and second meters 76, 78 carrying the fluids to a remote storage tank or tanks or to a return line.

In operation of the prior art system, a fluid mixture 200 is first introduced into the surge tank where the fluid mixture 200 is allowed to collect, whereafter the fluid mixture 200 is transferred to the inlet 29 of the vessel 20. The fluid mixture 200 is then collected within the interior 21 of the vessel 20, where it separates into its fluid components of differing specific gravities, primarily crude oil as a lighter fluid 210, rising to the top portion 25 of the vessel 20, with a heavier fluid 220, primarily water, separating to the bottom portion 27 of the vessel 20. The float member 30, having the hollow interior 35 containing the neutral liquid ballast 100, preferably antifreeze liquid, is adjusted to float at a preferred adjusted level within the vessel 20, dependent upon a level of separation of the fluid mixture 200 within the vessel 20. When a quantity of heavier fluid 220 is reached in the tank, the float member 30 rises above the preferred adjusted level, urging the ball seal 38 on the lower end 36 of the float member 30 away from the tapered interior seat of the lower housing 60, expelling the heavier fluid 220 from the lower outlet 28 into the second pipeline 72 where it is measured by the second meter 78. As that heavier fluid 220 is released, the float member 30 is lowered dropping the ball seal 34 on the upper end 32 of the float member 30 away from the tapered interior seat of the upper housing 50, releasing the lighter fluid 210, or crude oil, through the upper outlet 26 into the first pipeline 70 where it is measured by the first meter 76. Cutoff valves 75 may be supplied on any of the first, second or third pipelines 72, 74, 76, or at the inlet line 42 to the surge tank 40.

In an alternative embodiment of the prior art system, an externally controlled buoyancy adjustment mechanism 90 is provided on the apparatus 10, allowing for the float member 30 to have its buoyancy adjusted without the need to disassemble the apparatus 10 or to manually fill the hollow interior 35 of the float member 30 with the neutral liquid ballast 100. The externally controlled buoyancy adjustment mechanism 90 comprising a fluid pump 92 having a fluid injection and extraction means 94 operated by a control lever 95, a fluid inlet line 96 connecting the fluid injection and extraction means 94 to the hollow interior 35 of the float member 30, and a fluid outlet line 98 connecting the hollow interior 35 at the lower end 36 of the float member 30 to the fluid injection and extraction means 94. This externally controlled buoyancy adjustment mechanism 90 thus operates to allow the introduction and extraction of the neutral liquid ballast 100 into the float member 30 by a pull or push of the control lever 95, adding or subtracting the neutral liquid ballast 100 from the hollow interior 35 of the float member 30 without disassembly of the apparatus 10. This embodiment may also provide the float member 30 with an air relief line 37 attached near the upper end 32 of the float member 30, the air relief line 37 further connecting to an air valve 39 located on the exterior surface of the vessel 20. This air valve 39 allows for the neutral liquid ballast 100 in the hollow interior 35 of the float member 30 to rise and fall with the addition or extraction of neutral liquid ballast 100 without concern over pressure or vacuum in the float member 30.

FIG. 1 shows the ball seal 34 on the upper end 32 of the float member 30 is conformed to sealably engage the tapered interior seat of the upper housing 50, while the ball seal 38 on the lower end 36 of the float member 30 is conformed to sealably engage the tapered interior seat of the lower housing 60. The float member 30 is of a length to be contained between the upper housing 50 and the lower housing 60 when the housings are attached to the vessel 20, but the ball seals 34, 38 on the upper end 32 and lower end 36 of the float member 30 are not engaged with the tapered interior seats of the upper housing 50 and lower housing 60 at the same time. This allows for either flow of the lighter fluid 210 from the upper outlet 26, heavier fluid 220 flow from the lower outlet 28 or both lighter fluid 210 and heavier fluid flow 220 from both the upper outlet 26 and lower outlet 28 simultaneously, but never restricting the fluid flow from both the upper outlet 26 and lower outlet 28 at the same time.

FIG. 1 shows that as the fluid passes through the respective first meter 76 and second meter 78, the quantity of fluids passing through the meters is recorded. In an alternative embodiment, these meters 76, 78 may be equipped with a remote interface means to allow the recorded volume of liquid passing through the meters to be wirelessly transmitted to a remote location, thereby avoiding the necessity to travel to a variety of locations to read the measurements recorded by the meters. This would be especially beneficial when numerous apparatus 10 are attached to numerous oil wells in distant locations.

It is contemplated within the scope of this invention that the geometric shape of the elements involved in the prior art invention are of no functional distinction, although correlated to be suitable for the stated purpose of the invention. Therefore, the shape of the float member 30 and the vessel 20 may be hexagonal, square, cylindrical as claimed and disclosed, triangular, oval, round or whatever shape may optimize the separation process. Likewise, the shape of the ball seals 34, 38 and the tapered interior seat must be consistent insofar as forming a seal, but their respective shapes may be flat, conical or wedge-shaped, or the valve seats and seals may form a sliding gate assembly. Additionally, the sealable engagement between the ball seals 34, 38 and the tapered interior seats may be of varying porosities to inhibit or accentuate the pressure according to the requirements, pressure, or viscosity of the fluids be measured or separated.

The prior art apparatus 10 may be furnished as a portable unit which would avoid having to disassemble the apparatus 10 when moving from one fluid source to another, enhancing transferability from one oil well to another, or it may be made a permanent part of the oil well. In the embodiment, the vessel 20 is supported above the ground on the support frame 15. It is also contemplated that the apparatus 10 may be mounted on a cart, trailer or wagon, and may include a protective cover, not shown.

The prior art apparatus 10 has advantages and addresses the issues presented by its prior art. The apparatus 10 and process requires nothing more than kinetic energy produced by the fluid flow for the basic apparatus 10 to operate. The fluid is under constant pressure and motion as it travels through the apparatus 10, thereby reducing the possibility of the fluid or contaminants clogging or forming solid deposits within the vessel 20, the surge tank or any of the pipelines, meters, inlets or outlets. Fluid is measured without draining or opening the lines. With the float member 30 suspended within the fluid and in constant motion so long as a fluid flow is maintained in the apparatus 10 and the ball seals 34, 38 on the upper end 32 and lower end 36 attaching in tandem on the float member 30, the constant motion prevents the ball seals 34, 38 from becoming stuck within the tapered interior seats Short of a cataclysmic failure or damage to the entire float member 30, the apparatus 10 cannot experience failure in a tapered interior seat or ball seals 34, 38 from opening or closing as the fluid volumes are constantly changed. Additionally, because the float member 30 would be biased towards keeping the upper outlet 26 and lower outlet 28 opened, due to the float member 30 adjusted to be suspended between the upper and lower outlets 26, 28, the fluid measurement is ongoing, thereby eliminating the need to guess, estimate of statistically deduce the fluid flow from the well, the meters conducting actual measurement of the fluid flow at a given moment, or a short or long period of time.

The prior art apparatus 10 is also capable of separating other mixed fluids which may separate due to distinctly differing specific gravities or may be applied to environmental cleanup activity. In this use, it may be desirable to leave the fluid separated and not connect the first and second pipelines 70, 72 back together past the first and second meters 76, 78, porting the fluids to separate storage tanks or vessels. Additionally, in oil spills, it may be desirable to gather water at the spill site using a skimming technique and using the apparatus to separate the petroleum product from the seawater and return the seawater to the sea. Also, use of the first and second meters 76, 78, singularly or both, may be deleted during this type use.

Figure 2:
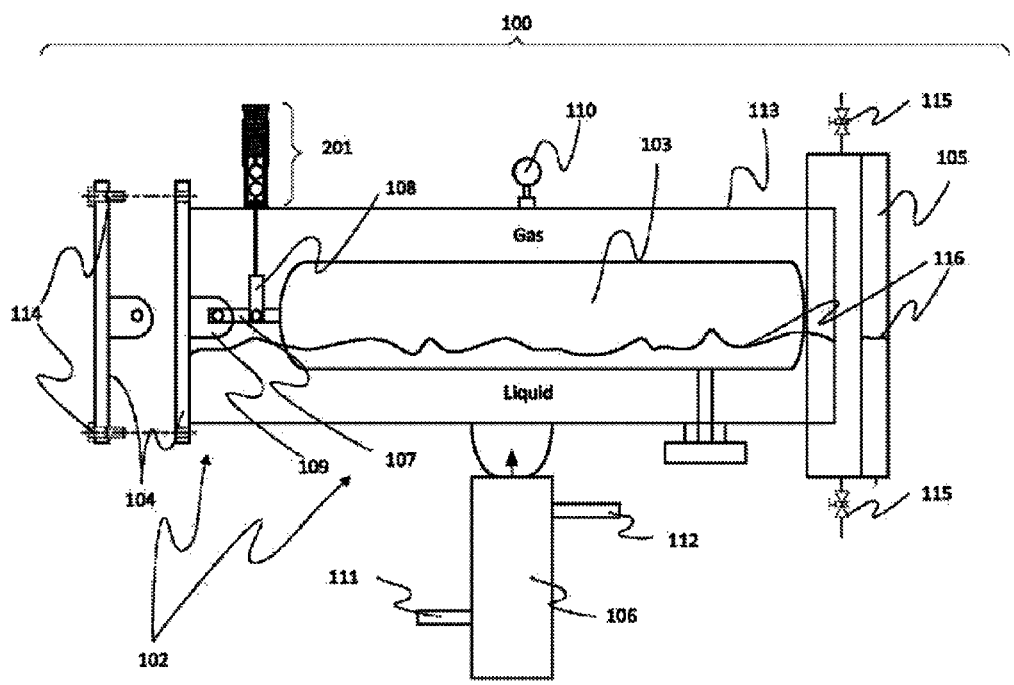
FIG. 2 shows the gas vent as illustrated in U.S. Pat. No. 8,298,407 to Caldwell.

FIG. 2 shows the prior art U.S. Pat. No. 8,298,407, herein incorporated by reference, comprising a gas vent 100 comprised of a horizontal float assembly 102, and a vertical gas valve assembly 201. The horizontal float assembly 102 is connected via a fluid connection to a surge tank 106, which receives it the fluid mixture from an oil well 112 or other connection to the overall gas processing system. Natural gas, petroleum liquids, or a combination of natural gas and petroleum liquids enters the horizontal float assembly 102 at the bottom of the housing 113 of the horizontal float assembly 102. The route to vent natural gas or other gaseous compounds is through the horizontal float assembly 102 and to the vertical gas valve assembly 201. For the natural gas to pass through the horizontal float assembly 102 and to the vertical gas valve assembly 201, the horizontal float assembly 102 is mechanically and fluidly connected to the vertical gas valve assembly 201 to permit natural gas and other gaseous components to leave the vertical gas valve assembly as described below. Embodiments of the gas vent 100 permit gas to be vented without the release of petroleum liquids.

The horizontal float assembly 102 shown in FIG. 2 is comprised of a housing 113; a horizontal float 103; a flange 104; a sight glass 105; one or more sight glass valves 115; a horizontal float lever arm 107; a vertical valve hinge arm 108, and a hinge 109. The horizontal float 103, the flange 104, the horizontal float lever arm 107, the vertical valve hinge arm 108, and the hinge 109 are all contained within the housing 113 of the horizontal float assembly 102.

The prior art housing 113 of the horizontal float assembly 102 is essentially a large hollow process vessel with various openings and fittings formed by the housing 113 to accept the various devices and connections for the horizontal float assembly 102 to function including, without limitation, connections for the flange 104, the sight glass 105, the one or more sight glass valves 115, and the hinge 109. The connections for the flange 104 are threaded connections. The connections for the sight glass 105, the one or more sight glass valves 115, and the hinge 109 may be welded connections. The pressure of the fluids in the horizontal float assembly 102 is monitored via a pressure gauge 110.

The prior art flange 104 serves to enclose an end of the housing 113. The flange 104 is affixed to the housing 113 via flange bolts 114. The flange 104 can be removed along with the horizontal float 103 for inspection and maintenance purposes. The flange 104 is removed horizontally and the horizontal float 103 is also removed horizontally. Once the flange 104 and horizontal float 103 are removed, access is available to the interior of the housing for inspection and maintenance.

In the best mode of operation of the gas vent 100 from the prior art, the gas vent 100 is mounted on top of a surge tank 106 or other appropriate gas processing vessel that contains natural gas fluids. Presumably, the natural gas fluids contain both gas and liquids, and the gas vent 100 is designed to allow the gases to vent without the presence of substantial quantities of liquids. If liquids are present, including any liquids entrained with the gas, the gas/liquid mixture enters the gas vent 100 via the housing 113. If there is not a significant amount of liquid present, the horizontal float 103 will not rise substantially and engage the plunge valve into the valve seat. If additional liquid enters the gas vent 100 and collects in the housing 113, the horizontal float 103 will be elevated. The elevation of the horizontal float 103 causes the horizontal float lever arm 107 to force upward the vertical valve hinge arm 108. Forcing the vertical valve hinge arm 108 upwards causes the lower float rod, upper float rod, and the plunge valve to be forced upward. If enough liquid enters the housing 113, the plunge valve is seated into the valve seat closing off the available exit to the gas vent 100 thereby preventing liquid petroleum fluids from exiting with gaseous natural gas. As the level of the petroleum liquid 116 falls, the reverse occurs and the plunge valve opens the aperture in the valve seat allowing gas to exit the gas vent without liquids. After the gas is removed the fluid mixture is sent to fluid separator 408 via a well tester feed line 111.

Figure 3:
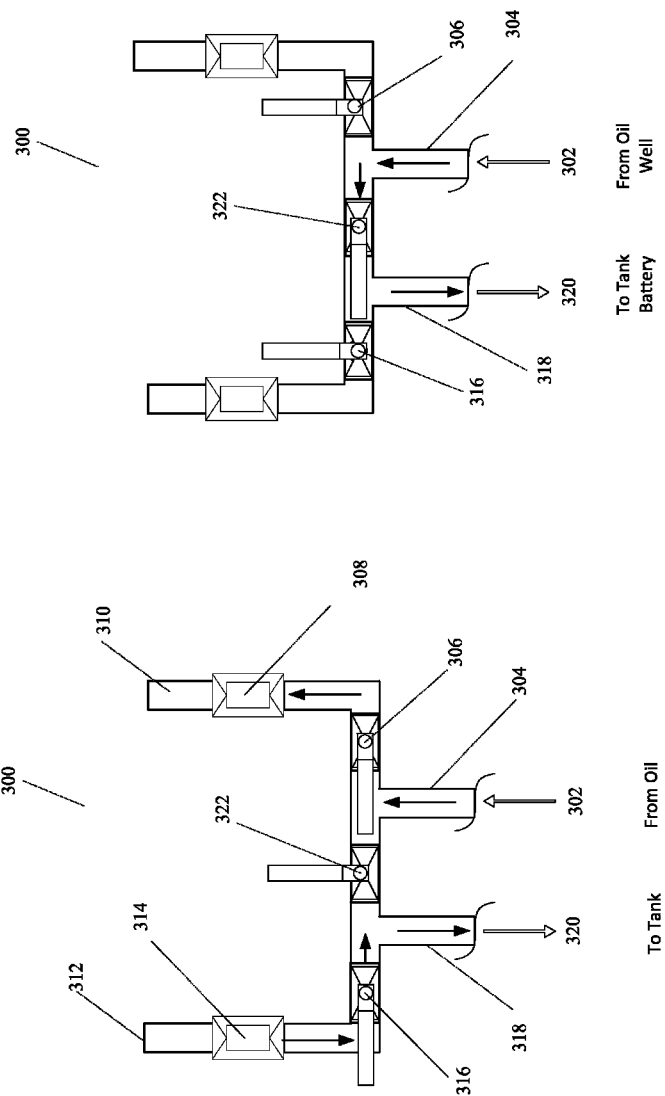
FIGS. 3A and 3B are detailed views of a fluid manifold with check valves controlling the fluid flow into and out of the improved testing system.

Moving on to the present invention, FIG. 3A is a detailed view of a fluid manifold 300 configured to allow the fluid flow from the oil well to the testing system 400 for measurement. This configuration may allow the testing system 400 to be placed in serial with the oil well and the tank battery thereby allowing the fluids to be separated and measured to determine the actual quantities of oil and water coming from the well and then may be recombined and returned to a single tank or tank battery.

The fluid mixture may pass from the well tester feed line 302 through the fluid inlet pipeline 304 of the manifold 300. The fluid mixture enters a tee that connects to a closed bypass valve 322 and continues through the open input valve 306, toward an input check valve 308. The input check valve 308 and a companion return check valve 314 may be used to reduce or eliminate the pulsations cause by the pumping action of the oil well therein providing the testing system 400 a steady flow of the fluid mixture. After passing through the input check valve 308, the fluid mixture passes through to the manifold feed line 310 to supply the input of the testing system 400. After the fluid mixture has passed through the testing system 400, the oil and water may be recombined into a single fluid mixture and then returned to the manifold 300 by the well tester return line 312. Upon returning through the well tester return line 312, the fluid mixture once again passes through a return check valve 314 described above. The fluid mixture then flows through an open return valve 316 allowing the fluid mixture to enter a tee attached to a closed bypass valve 322 and exit the manifold 300 through the tank battery feed 320. In this configuration the bypass valve 322 is closed forcing the fluid mixture to flow through the testing system 400 and back out to the tank battery. The valves may be selected from mechanical or electro-mechanical actuated valves so they can be actuated manually and remotely by a wireless system.

FIG. 3B is a detailed view of a fluid manifold 300 configured to bypass the testing system 400 allowing the fluid mixture to flow from the oil well to the tank battery without any separation and measurement. In this configuration, the testing system 400 may be fluidly removed but not mechanically removed from the serial path between the oil well and the tank battery. This configuration may allow for maintenance and repairs to be performed on the testing system 400 thereby minimizing environmental contamination and spilling.

In this configuration, the fluid mixture from the oil well may enter the well tester feed line 302 where the fluid mixture is directed to enter the open bypass valve 322 from the tee because the normally open input valve 306 in the previous configuration in FIG. 3A is closed preventing the fluid mixture from following the previous path, therein forcing the fluid to flow through the bypass valve 322. The fluid mixture enters a tee on the return side attached to a closed return valve 316 and is forced to exit the manifold 300 through the tank battery feed 320 continue to the tank battery. Bypassing the testing system 400 may be done for several reasons including but not limited to a malfunction, maintenance, and repairs. This configuration allows someone discovering a malfunction but does not have the capability to perform maintenance on the testing system 400 to bypass the testing system thereby preventing or minimizing environmental damage due to an oil spill.

Figure 4:
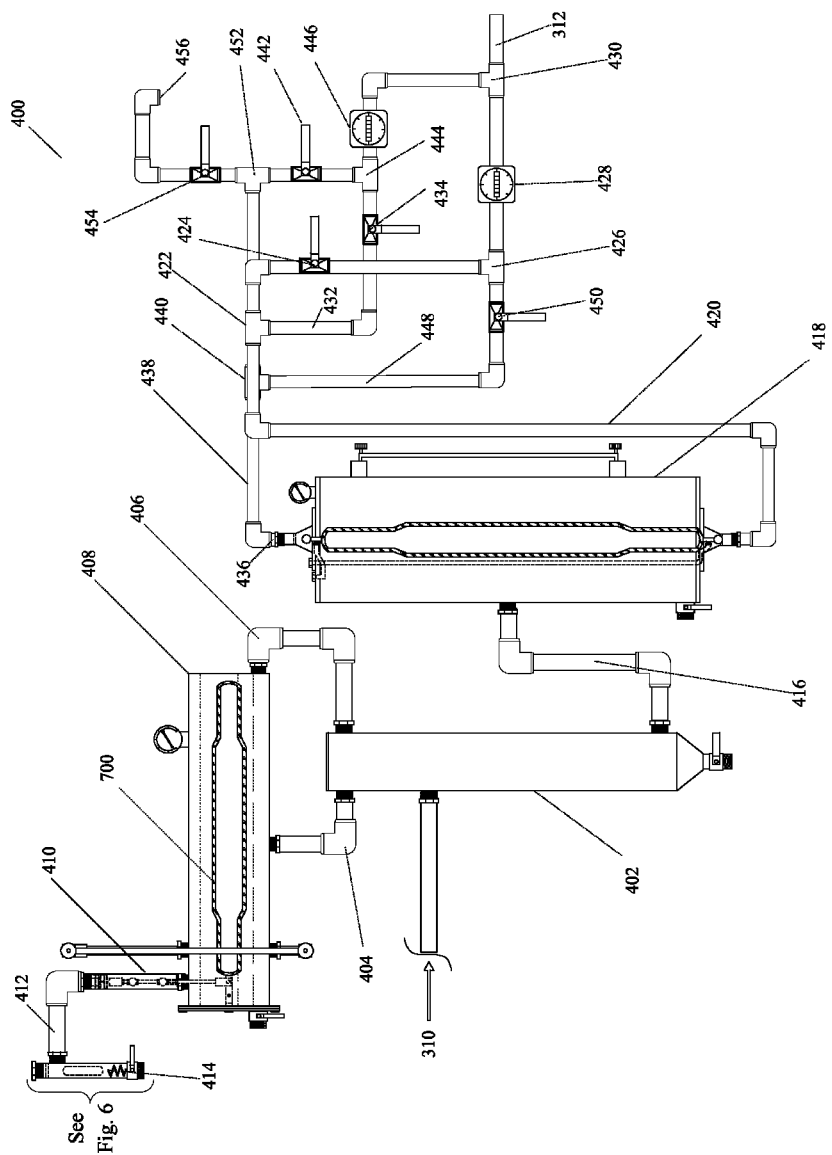
FIG. 4 is an overview of an improved oil field testing system with surge tank, the fluid separator, gas vent, and system improvements.

FIG. 4 is a detailed view of an improved oil field testing system with system improvements. The improved testing system 400 may include of a surge tank 402, a gas vent 408, a vertical gas valve 410, a spill preventer 414, a fluid separator 418, first meter 446, second meter 428, and a series of control valves. The fluid mixture containing natural gas, petroleum liquids, or a combination of natural gas and petroleum liquids hereinafter "fluid mixture" arrives from the manifold 300 through the manifold feed line 310 as described previously in FIG. 3A. The fluid mixture preferably enters the surge tank 402 midway up the surge tank 402. Upon entering the surge tank 402, the fluid mixture, specifically the oil and water, migrate to the lower end of the surge tank 402 and the gas that was contained within the fluid mixture rises to the top where it exits the surge tank 402 through the gas vent 408, which is fluidly connected to the surge tank 402 via gas pipelines 404 and 406. The gas pipeline 404 is mechanically attached to the bottom of the gas vent 408 and the gas pipeline 406 is mechanically attached to the end of the gas vent 408. The gas vent 408 will be described later in greater detail in FIGS. 6 and 7. A vertical gas valve 410 may be affixed both mechanically and fluidly to the top of the gas vent 408 to allow gas to exit. The vertical gas valve 410 is preferably mechanically and fluidly connected to a spill preventer 414 through a vertical valve pipeline 412. The spill preventer 414 may allow the gas to escape into the environment through the top of the spill preventer 414 or the spill preventer 414 may be connected to a pipeline or oil well wherein the gas may be discharged. If a failure happens to the horizontal float 700 causing the vertical gas valve 410 to remain open, the fluid mixture could pass through this vertical gas valve 410, through the vertical valve pipeline 412 and into the spill preventer 414. Additional fluid flow pressure associated with liquid in the spill preventer 414 closes the spill preventer 414 as discussed below.

After the majority of the gas has been removed from the fluid mixture through the surge tank 402 and the gas vent 408, the fluid mixture containing oil and water then proceeds to the fluid separator 418 via a fluid pipeline 416 that may preferably be positioned at the lower end of the surge tank 402 but above the debris trap 510 and connecting to the fluid separator 418 midway between the top portion 1004 and bottom portion 1010. The fluid then fills the separator 418 allowing a vertical float 1016 with balls seals 1104, 1110 on each end and tapered seats 1008, 1014 within the fluid separator's upper and lower housings 1006, 1012 to control the fluid mixture flow out of the separator to the first and second metering devices. The water, having a higher specific gravity, will flow out of the bottom of the fluid separator 418 through the second line riser 420, through a second line bypass tee 422 wherein the water continues to flow through an open second line valve 424 where it enters a second line tee 426, which then directs the water through the second meter 428 and toward the fluid combining tee 430, then to the well tester return line 312. Oil having a lower specific gravity, floats to the top and exits the fluid separator 418 through the first line riser 436, which then flows through the first line 438 to the first line bypass tee 440, then on to the gas relief tee 452 wherein any residual gas rises and is trapped below the gas relief valve 454 until an operator momentarily opens the gas relief valve 454 to discharge any small amount of remaining gas through the gas exit 456. The oil continues flowing to and through the open first line valve 442 to the first line tee 444 wherein the oil may be forced through the first meter 446 to the combining tee 430 and then out to the well tester return line 312. The previous configuration of valves allow the fluids to flow through their operational pathways to the fluid combining tee 430 and then to the tank battery. One improvement was to the second line riser 420, and the first line riser 436, wherein the previous patent, Caldwell U.S. Pat. No. 6,736,964, has uneven risers, thereby potentially biasing the internal float of the fluid separator 418 to one position where the bias may not be overcome by the fluid mixture in the fluid separator 418. Additionally, the internal biasing of the vertical float 1016 may cause erroneous readings depending on the fluid mixture ratio, wherein one of the constituents was not in sufficient quantities to overcome the bias caused by the differential riser heights, 420, 436. The improvement positions the second riser 420 at the same level as the first riser 436, thereby removing the float bias of the vertical float 1016 contained within the fluid separator 418.

As previously mentioned, the second riser 420 and the oil riser 436 enter into bypass tees that allow the water and oil both to be redirected through a single meter to verify that the meter is operating properly. To test the first meter 446, the water flows through the second line riser 420 that connects to a second line bypass tee 422, wherein the water is redirected to an alternate path by closing the second line valve 424 and forcing the water through the second line bypass 432 and the open second line bypass valve 434 to the first line tee 444 and combining with the oil before entering the first meter 446. By combing the oil and water momentarily to increase the overall flow through the first meter 446, the meter should display the increased flow if the first meter 446 is operating properly. This combined water and oil mixture then exits through the fluid combining tee 430 and then out through the well tester return line 312.

To check for proper operation of the second meter 428, oil exiting through the first line riser 436 flows to the first line bypass tee 440, wherein the first line valve 442 is closed forcing the oil through the first line bypass tee 440 and the first line bypass pipeline 448 continuing through the open first line bypass valve 450 to the second line tee 426 and combining the oil and water before entering the second meter 428. By combing the oil and water momentarily to increase the overall flow through the second meter 428, the meter should display the increased flow if the second meter 428 is operating properly. This combined water and oil mixture then exits through the fluid combining tee 430 and then out through the well tester return line 312. This combination of valves, tees, and bypass lines, preferably allows an operator, through a specific configuration, to test either the first meter 446 or the second meter 428, without removing either meter from the system, which prevents excessive spillage if both meters are working properly. This testing mode was not possible in the previous Caldwell Patent, U.S. Pat. No. 6,736,964. The valves used to direct the flow may be selected from mechanical or electro-mechanical actuated valves. Additionally, it is preferable that the first meter 446 is slightly higher in elevation than the second meter 428 to prevent any fluid contamination.

Additionally, the improved testing system 400 may be used to assist in environmental clean-up when oil or other hydrocarbons have been spilled in bodies such as oceans, rivers, lakes, and ponds whenever the separation of water and oil is necessary. The improved testing system 400 may be mounted on vehicles including, but not limited to, boats, barges and ships wherein the vehicles may be equipped with skimming equipment to more effectively capture the contaminated liquid. The contaminated liquid would be processed through the improved system 400 and the oil and other hydrocarbon contaminates would be stored and the cleaned water would be returned.

Figure 5:
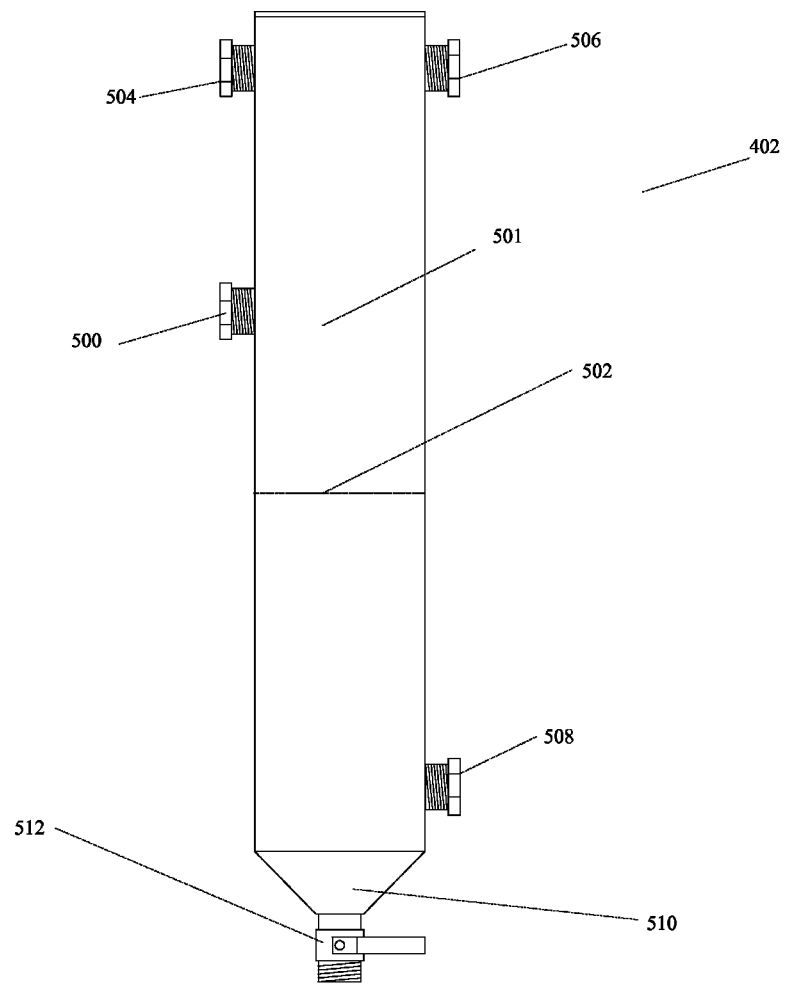
FIG. 5 is a detailed view of a surge tank.

FIG. 5 is a detailed view of a surge tank 402, shown in FIG. 4 of the drawings. The surge tank 402, may include an inlet line connection 500, an internal chamber 591, an outlet connection 508 for the gas free fluid mixture, attaching to the inlet 1000 of the vessel 1002, bottom gas line connector 504 and side gas line connector 506 both connecting to the gas vent 408, a debris trap 510 and clean out valve 512.

It is preferred that the inlet line 500 is positioned three-fourths the way up from the bottom of the surge tank 402 preferably higher than the outlet connection 508, allowing the gas to more easily escape through the gas vent 408 and produce a gas free fluid mixture to separate and measure. The fluid mixture from the oil well may contain water, gas, and oil. As the fluid mixture enters the internal chamber 501, it fills the internal chamber 501 to a fluid mixture level 502, which will move as more or less fluid mixture enters the surge tank 402. Once the mixture has entered the surge tank 402 the gas naturally separates from the liquid fluid mixture and exits through the bottom gas line connector 504 and side gas line connector 506. Additionally, if the surge tank 402 is filled, the fluid mixture may exit through these connectors 504, 506 and partially fill the gas vent 408, thereby actuating the float which will be discussed further in FIG. 6.

As the testing system 400 is used, debris from the oil well may travel along with the fluid mixture and may settle at the bottom of the surge tank 402 in a preferably cone-shaped debris trap 510. This debris trap 510 in conjunction with clean out valve 512 allows for the removal of the unwanted debris that may cause malfunctions of the testing system 400. Additionally, a hose or some other device may be connected to the clean out valve 512 or a bucket or other container may be placed underneath the clean out valve 512 to prevent any spillage onto the ground and environmentally contaminating the area.

In a preferred embodiment, the height of the surge tank 402 should be the same height as the fluid separator 418 to prevent biasing and maintain a consistent pressure. In the event the testing system 400 is used where a steady flow of fluid enters the vessel 1002, without pulsation, the surge tank 402 and the check valves 308, 314 may be omitted and the vessel 1002 may be connected directly to the fluid source at the inlet 1000.

Figure 6:
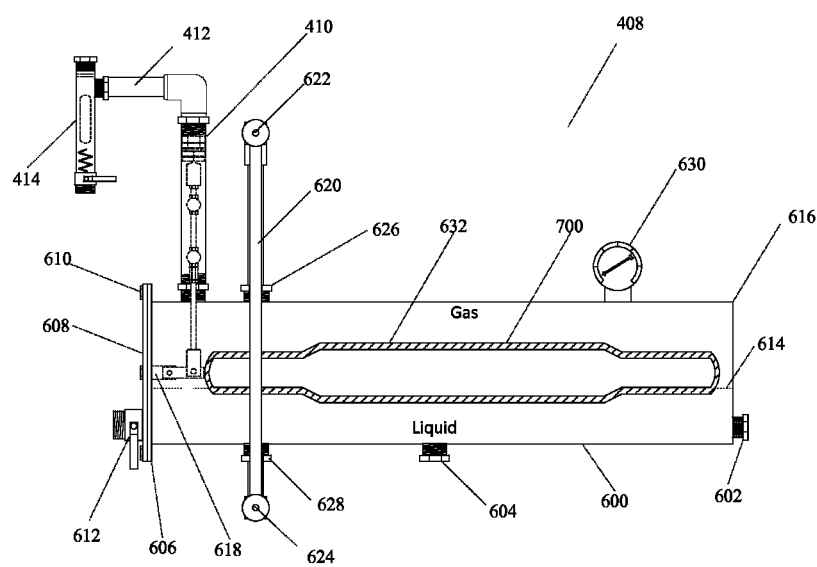
FIG. 6 is a detailed view of a gas vent assembly.

FIG. 6 is a detailed view of a gas vent 408 that may comprise a horizontal float assembly 616, and a vertical gas valve 410. The horizontal float assembly 616 is connected via a fluid connection to a surge tank 402 through gas line pipelines 404 and 406 that connect to the horizontal float assembly 616 at the side pipeline connector 602 and bottom pipeline connector 604. Natural gas, petroleum liquids, or a combination of natural gas and petroleum liquids may enter the horizontal float assembly 616 at the bottom or the side of the housing 600 of the horizontal float assembly 616 through the connectors 602, 604. For the natural gas to pass through the horizontal float assembly 616 to the vertical gas valve 410 and out through the spill preventer 414, the horizontal float assembly 616 is mechanically and fluidly connected to the vertical gas valve 410 to permit natural gas and other gaseous components to leave the vertical gas valve 410 as described below. Embodiments of the gas vent 408 permit gas to be vented without the release of petroleum liquids.

The horizontal float assembly 616 may be comprised of a housing 600, a horizontal float 700, a housing flange 606, flange 608, a sight glass 620, an upper sight glass valve 622, an upper sight glass connector 626, a lower sight glass valve 624, a lower sight glass connector 628, a horizontal float lever arm 702, a vertical valve hinge arm 704, a hinge 618, and a pressure gauge 630. The horizontal float 700, the horizontal float lever arm 702, the vertical valve hinge arm 704, and the hinge 618 are all contained within the housing 600 of the horizontal float assembly 616.

The housing 600 of the horizontal float assembly 616 is a hollow vessel with various openings and fittings formed by the housing 600 to accept the various devices and connections for the horizontal float assembly 616 to function including, without limitation, connections for the housing flange cover 606, flange 608, the sight glass 616, the one or more sight glass valves 622, 624, the hinge 618, side gas line connector 602, bottom gas line connector 604, and gas vent drain valve 612. One of the connections for the flange cover 606 to the housing flange 608 may be a threaded connections. The sight valve connections 626, 628 for the sight glass 620, the one or more sight glass valves 622, 624, may be welded connections.

The horizontal float 700 is a hollow vessel that partially floats on top of any liquid contained within the horizontal float assembly 616. In the embodiments of the gas vent 408, the float 700 is oriented horizontally. As the level of the petroleum liquid 614 contained in the horizontal float assembly 616 rises or falls, the horizontal float 700 rises and falls in conjunction with the level of the petroleum liquid 614. One end of the horizontal float lever arm 702 is connected to one end of the horizontal float 700. The other end of the horizontal float lever arm 702 is connected to the hinge 618. The horizontal float lever arm 702 is then pivotally connected to the hinge 618 so that as the horizontal float 700 rises and falls, the horizontal float lever arm 702 pivots around the hinge 618. Connected to the horizontal float lever arm 702 essentially midway between the hinge 618 and the horizontal float 700 is the vertical valve hinge arm 704 connected to the horizontal float lever arm 702 via a hinge pin 800. The other end of the vertical valve hinge arm 704 is connected to the lower float rod 706. The mechanical connection via the horizontal float lever arm 702 to the lower float rod 706 is what permits the gas vent 408 to allow or shut off natural gas venting.

The flange cover 608 and the housing flange 606 serves to enclose an end of the housing 600. The flange cover 608 is affixed to the housing flange 606 via flange bolts 610. The flange cover 608 can be removed along with the horizontal float 700 for inspection and maintenance purposes. The flange cover 608 is removed horizontally and the horizontal float 700 is also removed horizontally. Once the flange cover 608 and horizontal float 700 are removed, access is available to the interior of the housing for inspection and maintenance.

As the horizontal float 700 rises and falls with the level of the petroleum liquid 614 as a resultant buoyant force acting on the horizontal float 700. This buoyant force is transferred to the horizontal float lever arm 702 which in turn transfers the buoyant force to the vertical valve hinge arm 704. The vertical valve hinge arm 704 transfers the buoyant force to the lower float rod 706. The horizontal orientation of the horizontal float 700 allows a greater buoyant force to be transferred as indicated above than would be transferred if the float were vertically oriented. Alternatively, the pressure of the gas above the horizontal float 700 forces the horizontal float 700 downward. The downward movement of the horizontal float 700 lowers the plunge valve 712 allowing gas to escape. The pressure of the fluids in the horizontal float assembly 616 is monitored via a pressure gauge 630.

The sight glass 620 may be affixed to the side of the housing 600 through an upper sight glass connector 626, an upper sight glass valve 622, lower sight glass valve 624, and a lower sight connector 628. The connectors allow for a fluid connection between the fluids in the housing and the sight glass 620. As the level of the petroleum liquid 614 in the housing rises and falls the level of the petroleum liquid 614 can be determined by observation of the level of the petroleum liquid 614 in the sight glass 620. The sight glass valves 622, 624 may be connected via a welded connection to the sight glass 620 and allow for purging of material from the sight glass 620. Alternatively, the pressure of the gas above the horizontal float 700 forces the horizontal float 700 downward. The downward movement of the horizontal float 700 lowers the plunge valve 712 allowing gas to escape.

Figure 7:
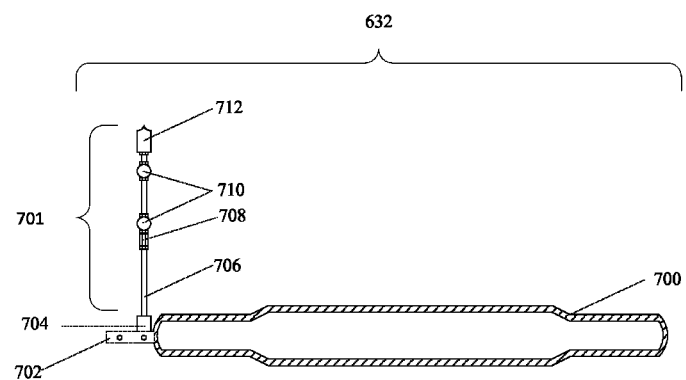
FIG. 7 is a detailed view of an internal assembly of the gas vent assembly.

FIG. 7 is a detailed view of an internal float assembly 632 of the gas vent 408. The internal float assembly 632 may comprise a horizontal float 700, a horizontal float lever arm 702, vertical valve hinge arm 704 and the vertical gas valve internal assembly 701. The vertical valve hinge arm 704 serves as the mechanical connection to the lower float rod 706 via the vertical hinge arm 704. More specifically, the vertical valve hinge arm 704 is connected to the horizontal float lever arm 702 via a hinge pin 800. The bottom of the lower float rod 706 may be welded to the vertical valve hinge arm 704. The lower float rod 706 extends upward from the vertical valve hinge arm 704 to the vertical gas valve 410 and may be comprised of a steel ail-thread rod. The top of the lower float rod 706 is connected to the lower ball guide 710 via a connector nut 708. As the horizontal float 700 rises and falls due to the level of the petroleum liquid 614, the hinge pin 800 rotates freely, and transmits the vertical force from the horizontal float 700 to the vertical valve hinge arm 704 and to the lower float rod 706. Alternatively, the pressure of the gas above the horizontal float 700 forces the horizontal float 700 downward. The downward movement of the horizontal float 700 lowers the plunge valve 712 allowing gas to escape.

Figure 8:
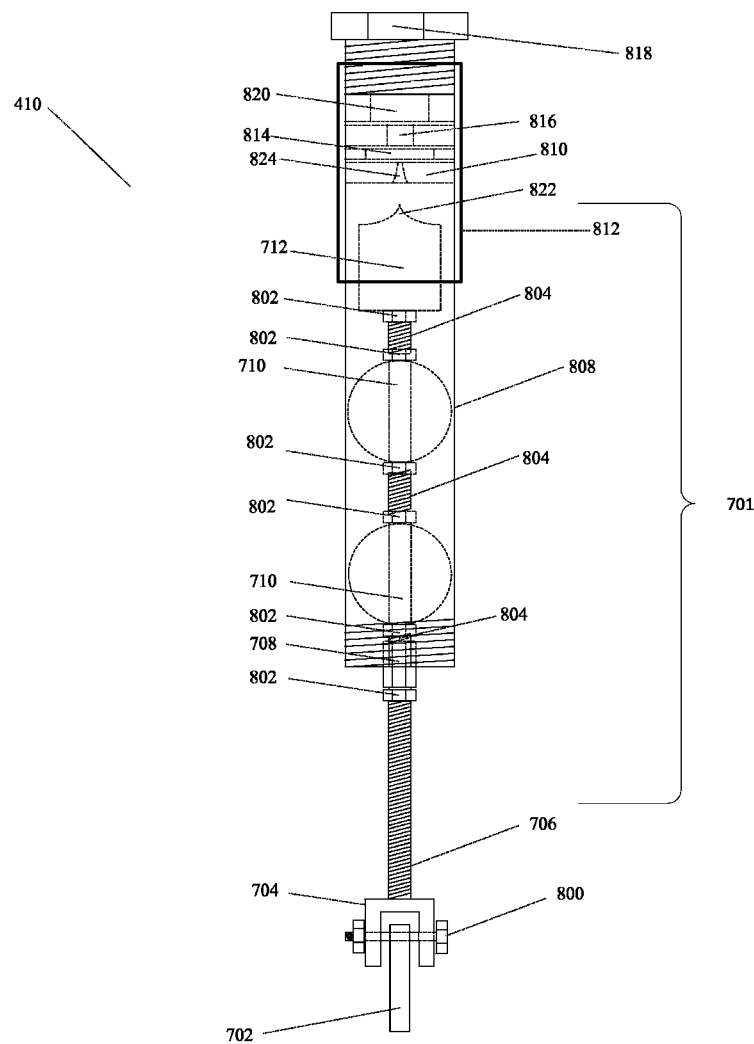
FIG. 8 is a detailed view of a vertical gas valve.

FIG. 8 is a detailed view of a vertical gas valve 410. The vertical gas valve 410 may comprise a lower gas valve housing 808, an upper gas valve housing 812 containing a valve seat 810 with a valve seat mating surface 824, an o-ring 814 and adapter 816, a spacer 820 and a jam nut 818 and internal movable assembly 701 described hereinafter. The internal movable assembly 701 may comprise a hinge pin 800, vertical valve hinge arm 704, a lower float rod 706, a connector nut 708, ball guides 710, an upper float rod 804, and a plunge valve 712 with a plunge valve mating surface 822.

The lower gas valve housing 808 may be threadedly affixed to gas vent 410 and the upper gas housing 812, which serves as a fluid connection from the gas vent 410 to the spill preventer 414. Additionally, the combination of housings encloses the internal movable assembly 701. The lower float rod 706 is connected to the connector nut 708, which may be used to adjust the length of the lower float rod 706. Standard nuts 802 may be positioned on either side of the connector nut 708 and tightened against the connector nut 708 to prevent disconnection during normal operations. The length of the lower float rod 706 may be adjusted by tightening or loosening the connector nut 708 that will shorten or lengthen the lower float rod 706 thereby changing the overall action of the gas vent 410.

The lower end of the upper float rod 804 is affixed to the connector nut 708. Above connector nut 708 an upper float rod 804 supports two or more ball guides 710. The two or more ball guides 710 slide onto the upper float rod 804 and are held their desired location with standard nuts 802 threaded onto the all-thread rod comprising the upper float rod 804. The placement of the two or more ball guides 710 can be adjusted by changing the placement of the standard nuts 802. The two or more ball guides 710 serve to keep the upper float rod 804 and lower float rod 706 centered in the vertical gas valve housing 808. The ball guides 710 may be sized such that there is sufficient space between the vertical gas valve housing 808 and the outside of the ball guides 710 thus providing a gas flow space. Further, the two or more ball guides 710 serve to prevent foreign matter from making its way up into the interior of the valve housing 808 and clogging the operation of the gas vent 410. The two or more ball guides 710 may be constructed of steel and may be designed to be slight smaller in diameter than the inner diameter of the housing 808 of the vertical gas valve 410.

Connected to the upper float rod 804 above the two or more ball guides 710 is the plunge valve 712. The vertical action of the lower float rod 706 and upper float rod 804 combination engages the plunge valve 712 with the valve seat 810. In one embodiment of the gas vent 410, the plunge valve 712 may be constructed from steel and may be threaded or welded affixed to the top of the upper float rod 804. In another embodiment of the gas vent 410, the plunge valve 712 and the valve seat 810 may be constructed from a non-magnetizable material such as materials including, without limitation, brass, ceramic or nylon.

The plunge valve 712 is constructed to mate with the valve seat 810. The plunge valve mating surface 822 of the plunge valve 712 mates with the valve seat mating surface 824. The valve seat mating surface 824 and the plunge valve mating surface 822 may be machined such that when the plunge valve 712 is engaged into the valve seat 810 only a small portion of the plunge valve mating surface 822 contacts the valve seat mating surface 824 with a relatively small circular area. This small circular area of contact is accomplished by the plunge valve mating surface 822 being of a different angle than the valve seat mating surface 824.

The valve seat 810 is mounted in the top portion of the upper gas valve housing 812. The valve seat 810 rests on top of the lower gas valve housing 808. The inside diameter of the upper gas valve housing 812 is larger than the outside diameter of the lower gas valve housing 808. The outside diameter of the valve seat 810 is smaller than the inside diameter of the upper gas valve housing 812. The outside diameter of the valve seat 810 may be larger than the outside diameter of the lower gas valve housing 808. The valve seat 810 is held in place from below by the lower gas valve housing 808. The valve seat 810 is held in place from above by an o-ring 814, an o-ring adapter 816, and a jam nut 818. In an alternative embodiment, a spacer 820 is located between the jam nut 818, and the o-ring adapter 816. When the jam nut 818 is engaged it squeezes the o-ring adapter 816, the o-ring 814 and the valve seat 810 down onto the shoulders of the lower gas valve housing 808. The jam nut 818 may be threadedly affixed to the inside of the of the upper gas valve housing 812.

Figure 9:
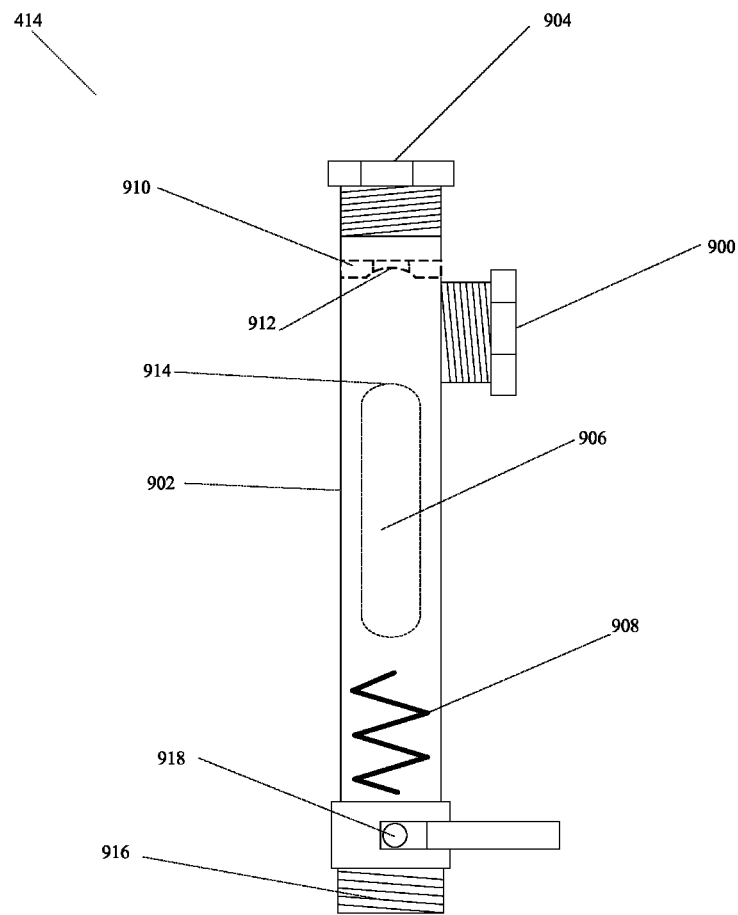
FIG. 9 is a detailed view of a spill preventer assembly.

FIG. 9 is a detailed view of a spill preventer 414. The spill preventer may comprise a housing 902, a gas exit 904, a vertical float 906, and a spring 908. A fluid mixture enters the vertical gas valve input 900, which is fluidly connected through the vertical valve pipeline 412 to the vertical gas valve 410. The vertical gas valve input 900 may be affixed to and near the top of the housing 902. At the top of the housing 902 may be a gas exit 904, which may allow the gas to vent directly to the environment, or may be introduced to a gas line and be reintroduced into the oil well. Not shown in FIG. 9 is a connection to a gas line or the oil well. Connected to the bottom of the housing 902 is a fluid drain valve 918 and a preventer cleanout connector 916 that may preferably allow the spill preventer to be cleaned over time to remove any buildup contained internally within the housing 902. Additionally, a hose or other subsequent device may be connected to the preventer cleanout connector 916 whereby the fluid mixture build-up inside the housing 902 may be controllably clean to prevent any spills on the ground causing environmental damage. Contained within the housing 902 may be a spring 908, a float 906, and a float seat 910 wherein the float 906 and the float seat 910 have mating surfaces that prevent the fluid mixture from escaping when the surfaces are in contact. The spring 908 preferably prevents the float 906 from contacting the bottom of the housing 902 and becoming trapped in the sludge and debris thereby preventing the float's 906 proper operation. The spring may be replaced by other float support means including but not limited to a pin, and washers. The hollow float 906, which may be selected from plastic, metal and rubber, sets on top of the spring 908 until the fluid mixture which is typically just gas includes other particulates such as oil and water. While the gas departs through the gas exit 904 with the drain valve closed, the fluid mixture may accumulate on the bottom of the housing 902 and the once the fluid mixture level has reached the bottom of the float 906 it causes the float 906 to rise with an increase in fluid level. As the float 906 rises, it nears the float seat 910 close to the top of the spill preventer 414. At the top of the float 906 is a mating surface 914 that has a companion mating surface 912 that may be integrated into the float seat 910. The accumulation causes the float 906 to rise, as it rises, the float's mating surface 914 contacts the float seat's 910 mating surface 912 thereby closing the exit for the fluid mixture. Upon the closure of the gas exit 904, no gas is released, and the gas is forced to remain in the fluid mixture that will flow to the separator 418. This condition may degrade the measurements of the first meter 446 and the second meter 428. This condition may occur when the float 700 in the gas vent 408 malfunctioned thereby leaving the vertical gas valve 410 open for fluid mixture to move through the vertical gas valve 410 to the spill preventer 414.

Figure 10:
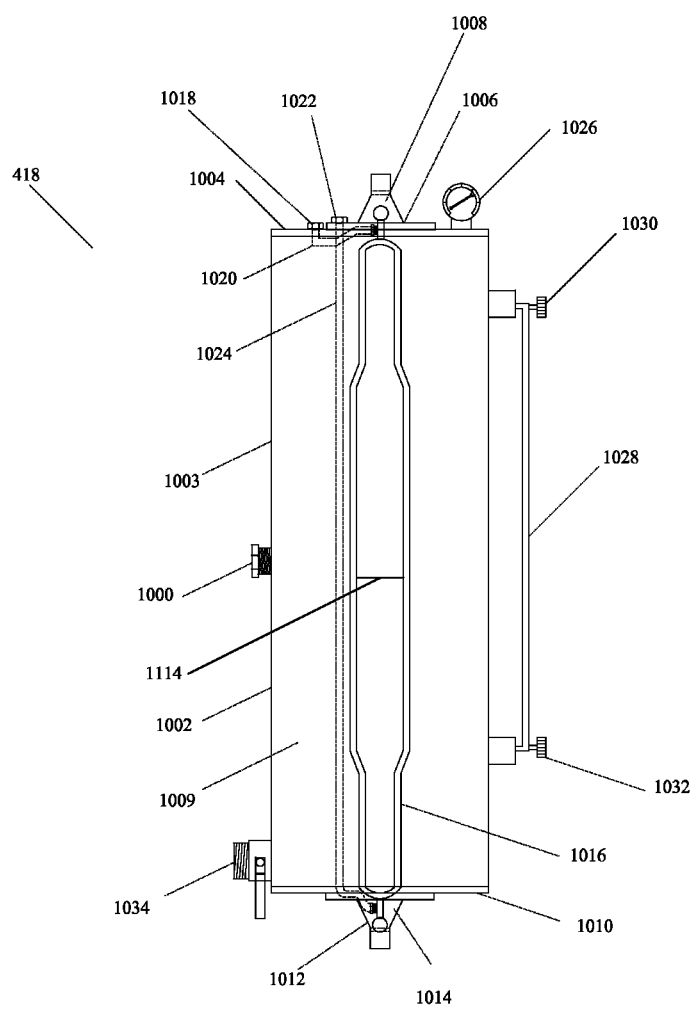
FIG. 10 is a detailed view of a fluid separator.

FIG. 10 is a detailed view of a fluid separator 418 for separating mixed fluids, more specifically the separation of crude oil and water, the separator 418 comprising a vertically oriented cylindrical vessel 1002, the vessel 1002 having an interior 1009, an exterior surface 1003, an upper housing 1006 attached to the top portion 1004 of the vessel 1002, a lower housing 1012, attached to the bottom portion 1010 of the vessel 1002 and an inlet 1000 located approximately half way between the top portion 1004 and bottom portion 1010 from the exterior surface 1003 into the interior 1009 of the vessel 1002, an adjustably buoyant vertical float member 1016 positioned within the interior 1009 of the vessel 1002, the float member 1016 having an upper end 1100 and a lower end 1106 disposed between an upper housing 1006 and a lower housing 1012, each of the upper housing 1006 and lower housing 1012 having a tapered interior seat 1008, 1014 adapted to sealably engage rounded ball seals 1104, 1110 on the respective upper end 1100 and lower end 1106 of the float member 1016. The fluid separator 418 preferably includes comprises a sight glass 1028 with an upper sight glass valve 1030 and lower sight glass valve 1032 that preferably allows the fluid mixture to be visually seen, a pressure gauge 1026 to monitor the pressure of the fluid mixture in the fluid separator 418, a drain valve 1034 that may allow the separator 418 to be drained to facilitate maintenance and the vertical float member 1016, and an externally controlled buoyancy adjustment mechanism allowing for the float member 1016 to have its buoyancy adjusted without the need to disassemble the separator 418. The adjustment mechanism may utilize a fluid inlet valve 1022, a fluid inlet line 1024 connected at the bottom of the vertical float member 1016, and an air valve 1018 and an air relief line 1020 connected at the top of the vertical float member 1016 wherein the buoyancy may be adjusted by opening both valves 1018, 1022 and connecting a neutral liquid ballast 1114 source to the fluid inlet valve 1022. The neutral liquid ballast 1114 may be manually extracted or injected through the fluid inlet valve 1022 that is fluidly connected through the fluid inlet line 1024 to the vertical float member 1016 by injecting the ballast 1114 into the vertical float member 1016 and forcing air out through the air valve 1018, which is fluidly connected to the vertical float member 1016 by an air relief line 1020. This air valve 1102 allows for the neutral liquid ballast 1114 in the vertical float member 1016 to rise and fall with the addition or extraction of neutral liquid ballast 1114 without concern over pressure or vacuum in the vertical float member 1016. Extraction is the reverse operation wherein ballast 1114 is removed while air is drawn into the vertical float member 1016 to increase buoyancy.

When assembled, a fluid mixture is first introduced into the surge tank 402 where the fluid mixture is allowed to collect, where after the fluid mixture is transferred to the inlet 1000 of the vessel 1002. The fluid mixture is then collected within the interior 1009 of the vessel 1002, where it separates into its fluid components of differing specific gravities, primarily crude oil as a lighter fluid, rising to the top portion 1004 of the vessel 1002, with a heavier fluid, primarily water, separating to the bottom portion 1010 of the vessel 1002. The vertical float member 1016, having the hollow interior 1112 containing the neutral liquid ballast 1114, preferably antifreeze liquid, is adjusted to float at a preferred adjusted level within the vessel 1002, dependent upon a level of separation of the fluid mixture within the vessel 1002. When a quantity of heavier fluid is reached in the tank, the vertical float member 1016 rises above the preferred adjusted level, urging the ball seal 1110 on the lower end 1106 of the vertical float member 1016 away from the tapered interior seat 1014 of the lower housing 1012, expelling the heavier fluid from the lower housing 1012 into the second line riser 420. As that heavier fluid is released, the float member 1016 is lowered dropping the ball seal 1104 on the upper end 1100 of the vertical float member 1016 away from the tapered interior seat 1008 of the upper housing 1006, releasing the lighter fluid, or crude oil, through the upper housing 1006 into the first line riser 436.

Figure 11:
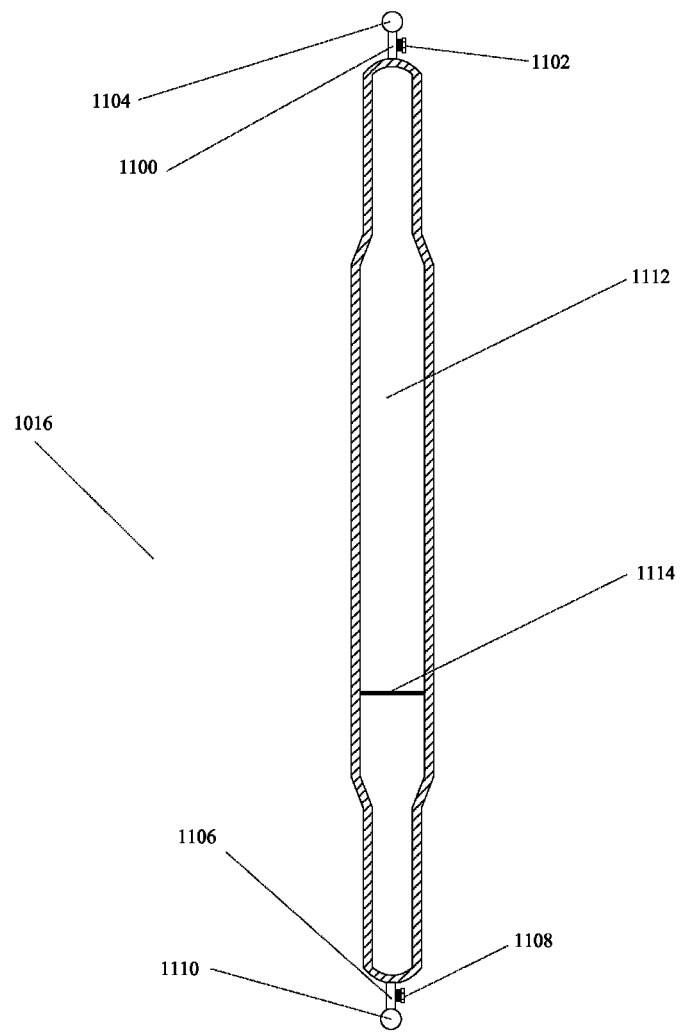
FIG. 11 is a detailed view of a vertical float member.

FIG. 11 is a detailed view of a vertical float member 1016. The vertical float member 1016 has a hollow interior 1112 which may be filled with a neutral liquid ballast 1114 to adjust the buoyancy of the float member 1016, the float member 1016 having an upper end 1100 with an air valve connection 1102 and a rounded ball seal 1104 and lower end 1106 with a fluid inlet line 1108 and a rounded ball seal 1110. The fluid inlet line 1108 in cooperation with air valve connection 1102 preferably may allow fluid preferably antifreeze to be added or removed from the vertical float member 1016 to change the buoyancy to a level desired by the operator.

The ball seal 1104 on the upper end 1100 of the float member 1016 is conformed to sealably engage the tapered interior seat 1008 of the upper housing 1006, while the ball seal 1110 on the lower end 1106 of the float member 1016 is conformed to sealably engage the tapered interior seat 1014 of the lower housing 1012. The float member 1016 is of a length to be contained between the upper housing 1006 and the lower housing 1012 when the housings are attached to the vessel 1002, but the ball seals 1104, 1110 on the upper end 1100 and lower end 1106 of the float member 1016 are not engaged with the tapered interior seats 1008, 1014 of the upper housing 1006 and lower housing 1012 at the same time. This allows for either flow of the lighter fluid from the upper housing 1006, heavier fluid flow from the lower housing 1012 or both lighter fluid and heavier fluid flow from both the upper housing 1006 and lower housing 1012 simultaneously, but never restricting the fluid flow from both the upper housing 1006 and lower housing 1012 at the same time.

The purpose of the abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application which is measured by the claims, nor is it intended to be limiting as to the scope of the invention in any way.

While the invention has been shown, illustrated, described and disclosed in terms of specific embodiments or modifications, the scope of the invention should not be deemed to be limited by the precise embodiments or modifications therein shown, illustrated, described or disclosed. Such other embodiments or modifications are intended to be reserved especially as they fall within the scope of the claims herein appended.

Having thus described the invention, I claim:

1. An improved fluid separator and tester having a vertically oriented vessel positioned on a support frame, an adjustably buoyant float member, an upper and lower housing having a tapered interior seat, an external surge tank, a first pipeline connecting to the upper housing, a second pipeline connecting to the lower housing and a gas vent connected to the fluid separator having a horizontal float assembly, a vertical gas valve assembly, the improvement comprising:
  a. a set of risers wherein risers, each feeding a flow meter, are set at equal height adapted to equalize pressure thus removing bias and increasing the overall accuracy of the meters;
  b. at least one valve adapted to redirect fluid flow to verify flow meters are functionally properly; and
  c. a spill preventer having—
    i. a connection to a vertical gas valve adapted to receive gas and other particulates,
    ii. a housing,
    iii. at least one float adapted to reside inside the housing and move freely,
    iv. an upper float seat adapted to receive a float to seal an opening and prevent the escape of particulates while allowing the venting of gas,
    v. a float support means, and
    vi. a discharge means for expelling the accumulated contents,
  whereby the improvements provide increased accuracy in determining a volume of each type of input fluid during operations, allow for the assessment of proper operation of the meters, and prevent environmental contamination in the event of system malfunction.

2. The improvement of claim 1, wherein a valve is selected from mechanical and electromechanical.

3. The improvement of claim 1, where the float is selected from plastic, metal and rubber.

4. The improvement of claim 1, where a float support means adapted to bias a float above the bottom of a housing and prevent sticking, the float means selected from a group consisting of a spring, a pin, and washers.

5. The improvement of claim 1, wherein the improvement is adapted for environmental clean-up for bodies of water, the bodies of water selected from oceans, rivers, lakes, and ponds.

6. An improved separator and tester having a vertically oriented vessel positioned on a support frame, an adjustably buoyant float member, an upper and lower housing having a tapered interior seat, an external surge tank, a first pipeline connecting to the upper housing, a second pipeline connecting to the lower housing and a gas vent connected to the fluid separator having a horizontal float assembly, a vertical gas valve assembly, the improvement comprising:
   a. a pair of risers wherein both risers, each feeding a flow meter, are set at equal height adapted to equalize pressure thus removing bias and increasing the overall accuracy;
   b. two valves adapted to redirect fluid flow to verify flow meters are functionally properly; and
   c. a spill preventer having—
      i. a threaded connection to the vertical gas valve adapted to receive gas and other particulates,
      ii. a vertical cylindrical housing,
      iii. a vertical float, adapted to reside inside the housing and move freely,
      iv. an upper float seat adapted to receive a float to seal an opening and prevent the escape of particulates while allowing the venting of gas,
      v. a spring adapted to bias the vertical float from a housing bottom, and
      vi. a valve adapted for expelling the accumulated contents,
   whereby the improvements provide for increased accuracy in determining the volume of each type of input fluid during high pressure operations, allow for the assessment of proper operation of the meters, and prevent environmental contamination in the event of system malfunction.

\* \* \* \* \*